Sept. 9, 1969  A. R. FATOSME ET AL  3,465,487

BUILDING OF WALLS

Filed Aug. 22, 1967  11 Sheets-Sheet 1

Fig.1

INVENTORS
Albert Rene Fatosme
Henri Georges Coste
BY Melville, Strasser, Foster & Hoffman
ATTORNEYS Sept. 9, 1969  A. R. FATOSME ET AL  3,465,487
BUILDING OF WALLS
Filed Aug. 22, 1967  11 Sheets-Sheet 2

Fig. 12

Sept. 9, 1969  A. R. FATOSME ET AL  3,465,487
BUILDING OF WALLS
Filed Aug. 22, 1967  11 Sheets-Sheet 5

Fig. 13

INVENTORS
Albert Rene Fatosme
Henri Georges Coste

BY Nebille, Strasser,
Foster & Hoffman

ATTORNEYS

Fig. 14

Sept. 9, 1969　　　A. R. FATOSME ET AL　　　3,465,487
BUILDING OF WALLS
Filed Aug. 22, 1967　　　　　　　　　　　　　　　11 Sheets-Sheet 9

INVENTORS
Albert Rene Fatosme
Henri Georges Coste
BY *Melville, Strasser, Foster & Hoffman*
ATTORNEYS United States Patent Office 3,465,487
Patented Sept. 9, 1969

3,465,487
BUILDING OF WALLS
Albert Rene Fatosme, Herouville-St.-Clair, Calvados,
France, and Henri Georges Coste, 3 Place Pereire,
Paris, France
Filed Aug. 22, 1967, Ser. No. 662,537
Claims priority, application France, Aug. 23, 1966,
73,886
Int. Cl. E04b 2/78, 2/56
U.S. Cl. 52—241                                    4 Claims

ABSTRACT OF THE DISCLOSURE

The object of the present invention is to provide a partition system composed of an assembly of simple elements capable of being manufactured industrially, these elements can be easily assembled without special working, without nails or screws, and can be connected to walls, floors, and ceilings without plugged screws or nails and without adding special coverings and fillets, they enable all shapes and dimensions of partions to be made up in buildings in which the distances between bearing walls are a multiple of a given length, which will hereinafter be referred to as the "building module."

---

This invention relates to the construction of separating partitions or retaining walls in buildings with the aid of prefabricated elements.

Known prefabricated partition systems are generally made up either of a large number of different elements, which are usually not standardised and are constructed by craftsmen in accordance with the dimensions of the partition to be built, or of simple, standardised elements which nevertheless require manual adaptation on the worksite in order to assemble the elements and connect them to floor, ceilings, walls, and openings.

The object of the present invention is to provide a partition system composed of an assembly of simple elements capable of being manufactured industrially. These elements can be easily assembled without special working, without nails or screws, and can be connected to walls, floors, and ceilings without plugged screws or nails and without adding special coverings and fillets. They enable all shapes and dimensions of partitions to be made up in buildings in which the distances between bearing walls are a multiple of a given length, which will hereinafter be referred to as the "building module."

Openings or doorways are each provided by frameworks of a single type and a single model of door can be used, without the need of specifying the direction of opening of the door. Said frameworks are made up of uprights and covering members, and only these covering members and uprights, and also covering members for obtuse angles, require screws for their fastening. The plumb of the door framework uprights and the clearance between the latter and the doors is controlled by a single screw driver which is the only tool needed for erection of the partition.

A fanlight for the doors is designed so that, if required, it may be a light source providing the main lighting of corridors or small rooms and the background lighting of large rooms.

According to the present invention, an assembly of prefabricated elements intended to constitute separating partitions or retaining walls in a building having a given height between floor and ceiling and a distance between bearer walls equal to a multiple of a given building module, comprises posts having a cross-section in the form of a potent cross and of a length slightly less than said height between ceiling and floor, post end pieces constituted by boxes of square section open at one end and having an opening in at least one side face thereof, and adapted to be engaged over the ends of the said posts, a compression spring for the top end piece, adapted to be placed within the top end piece between the top end of said post and an end face of said end piece, plinth and cornice elements which are identical inter se, having a given height and a length equal to said building module, less the width of one post end piece, and having a U-shaped cross-section, wedges capable of being inserted into the ends of said plinth and cornice elements and having a projection which is provided to penetrate said opening provided for the purpose in said side face of said end pieces, two types of panels constituted by simple boards of a given thickness and of a height substantially equal to said height between ceiling and floor, less the height of said plinth and cornice elements, one of said types of panels having a length equal to the thickness of said partition which is itself equal to the thickness of one post plus twice the thickness of a panel and the other type having a length equal to said building module less the said thickness of said partition, mounts to carry said panels on said plinth elements and fastening means to secure said panels to said posts.

Each of the elements listed above is of a single type and the total number of different elements is therefore extremely small. Details of the construction of these elements and the method of assembling the same, and also details of other elements likewise restricted in number, which serve to make up free openings with or without doors and lighting openings, and so on, will be found in the description given hereinbelow.

Examples of the construction of various elements entering into the composition of the partitioning device according to the invention, and different assemblies of these elements are illustrated in the accompanying drawings, in which.

Figure 1:
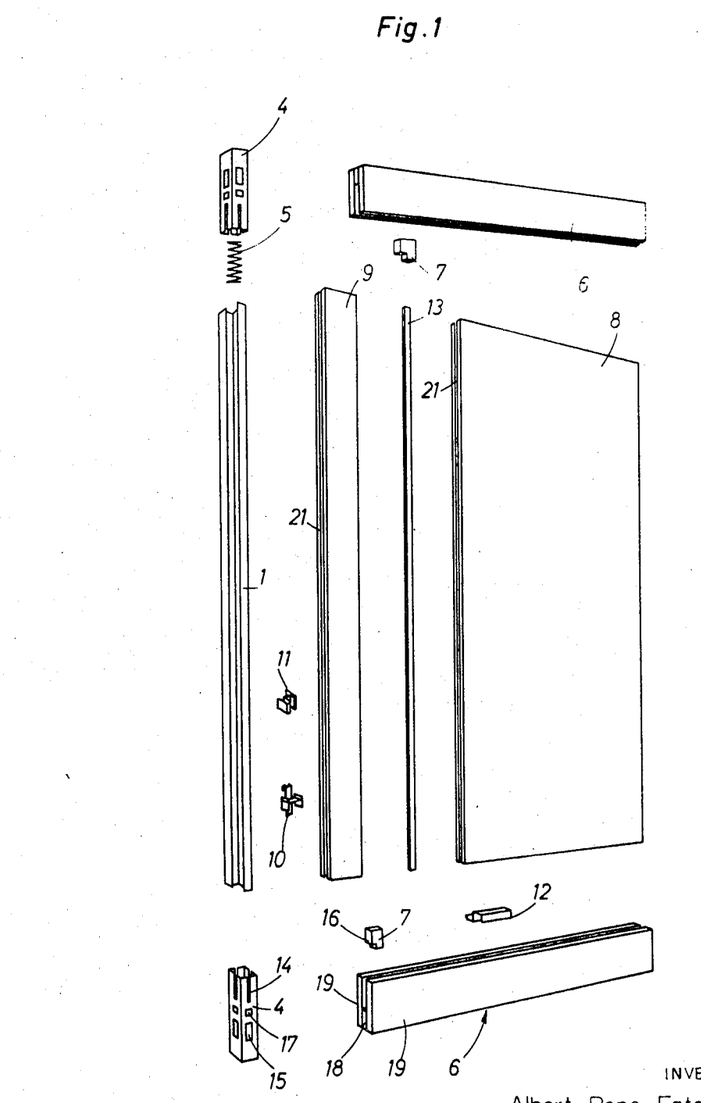
FIGURE 1 is a general view in perspective of the fundamental elementary parts disposed in positions corresponding to their subsequent assembly.

The elements of which the device according to the invention is composed comprise (FIG. 1): posts 1 of cruciform cross-section, post end pieces 4 intended to fit over the ends of each post after insertion, at the top end of the post, of a spring 5, cross-members 6 forming plinths or cornices, wedges 7 serving to secure the plinths or cornices on the posts, panel elements 8, 9, brackets 10 and clips 11 to secure the panels on the posts, mounts 12 to support the panels on the plinths and loose tongues 13 intended to make the connection between the panel elements.

Figure 2:
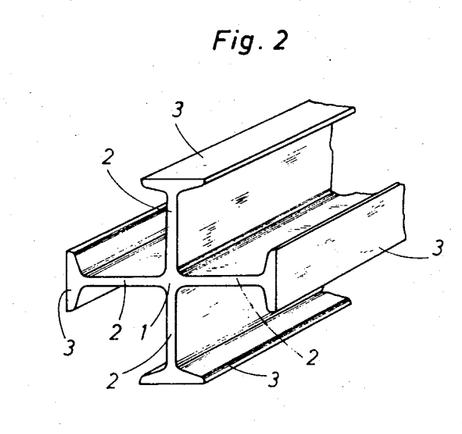
FIGURE 2 is a view in perspective on a larger scale of an element constituting a post.
Figure 3:
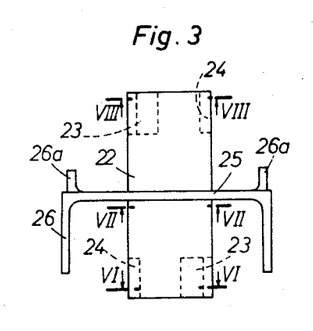
FIGURE 3 is a front view of a T-shaped bracket for fastening panels onto the posts.
Figure 4:
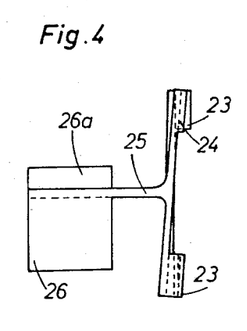
FIGURE 4 is a side view of said bracket.
Figure 5:
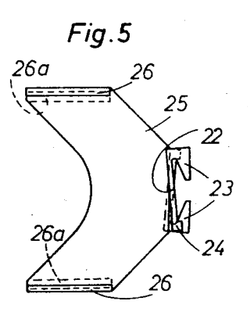
FIGURE 5 is a view of the same from below.

The cruciform posts (FIG. 2) which may be made from metal, for example aluminium alloy or steel or plastics material, reinforced or otherwise, comprise four webs 2, each ending in a sole plate 3, the cross-section of the whole assuming the shape of a potent cross.

Figure 13:
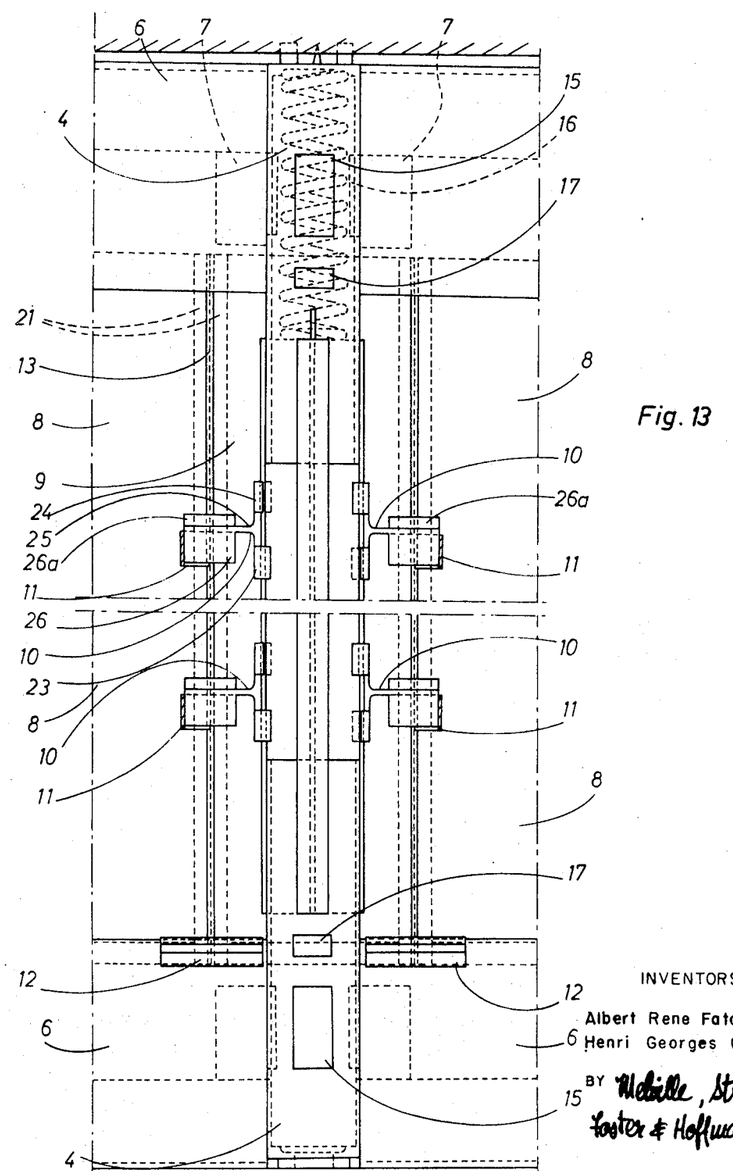
FIGURE 13 is a view in vertical section along the line XIII—XIII in FIGURE 12.

The post end pieces 4 (see FIGS. 1, 2 and 13) consist of parallelipiped boxes of square-cross-section, moulded for example in aluminium, Zamak or plastics material. On each of their rectangular faces, they are provided with slots 14 into which the flanges 2 of the posts 1 can engage, the faces of the box part sliding against the front faces of the sole plates 3 of the posts and, with two apertures, there being a large opening 15 designated to receive either the nose 16 of the wedge 7 or a current socket, and a small aperture 17 through which, if required, electrical cables can pass, as will be stated hereinafter.

Figure 14:
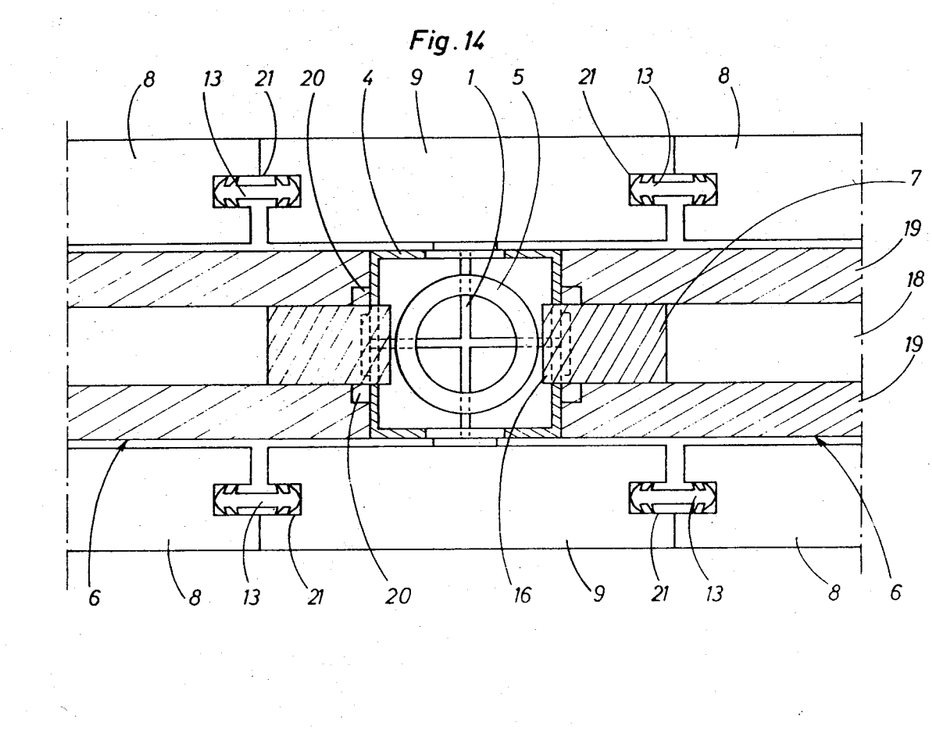
FIGURES 14 and 15 are two views in horizontal section along the lines XIV—XIV and XV—XV in FIGURE 12 respectively.
Figure 15:
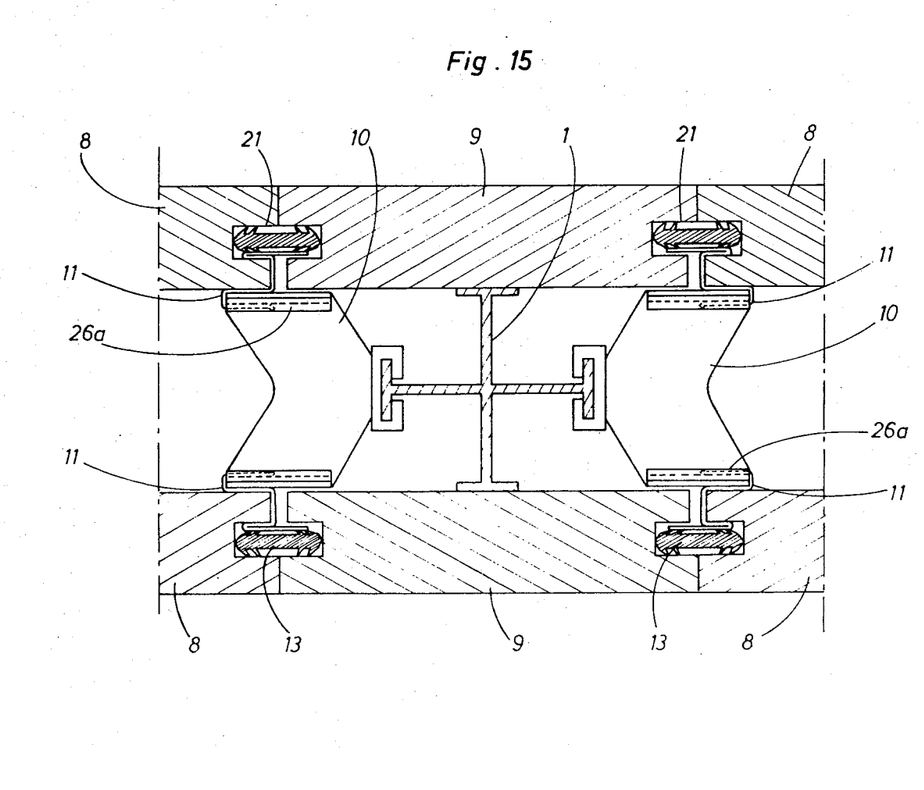

The members 6 which form plinths or cornices consist of a wooden core 18, the height of which is approximately one-third that of the member and on either side of which are glued fillets 19, likewise made from wood. These members, identical for both plinths and cornices, are equal in length to the building module, less the width of one end piece 4. In the longitudinal edge of the fillets situated one on either side of the core 18 and in the end portions of these fillets 19, grooves 20 (FIG. 14) are advantageously provided, to serve as a means of holding a sealing material.

The panels, which may be comprised of any suitable materials, for example, chipboard, are rectangular in shape and have along their bottom edge and along their two side edges, a groove 21 intended to receive a loose assembly tongue 13 and, if need be, and as will be described hereinafter, the head of the clips 11 which secure the panels to the posts 1. These panels are of three types which differ from one another only in width, which may be either the building module less the total thickness of the partition or the thickness of the partition or twice the building module less the total thickness of the partition. They may be made at a factory and delivered ready for assembly and may also be provided, at the factory or on the building site, with surfacings of suitable nature, such as paint, paper, plastics material, etc.

Figure 6:
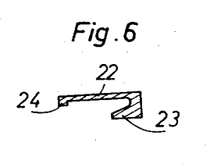
FIGURES 6, 7 and 8 are views in section respectively along the lines VI—VI, VII—VII, VIII—VIII in FIGURE 3.
Figure 7:
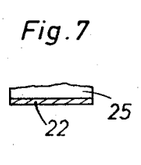
Figure 8:
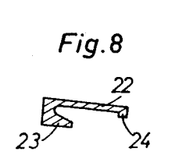

The panels 8 or 9 are mounted on the posts 1 by means of the brackets 10 and clips 11. The brackets 10 (FIGS. 3 to 8), which are mouldings ready for use, are made from material such as aluminium, Zamak or a plastics material, and they comprise a mounting plate 22 which is a little larger than the sole plate of the post 1 and which is helical or twisted in shape (see in particular FIGS. 6 to 8). In two diagonally-opposite corners, this plate has hook-shaped projections 23 adapted to engage on one edge of a sole plate of the post 1 and, on the two corners situated on the other diagonal, it has lugs 24 capable of engaging over the opposite edge of the said sole plate. This mounting plate 22 has extending from it a plane horizontal bracket 25 which flares out and carries on either side, in its widest part and on its lower face, two downwardly-pointing vertical projections 26, the distance between the outer faces of these two projections being equal to the thickness of the plinths or cornices, that is to say equal to the width of the post, or as will be seen hereinafter, to the space existing between the panels forming the two walls of the partition. The upper face of the bracket 25 carries, on both sides, two shorter projections 26a which point upwards and which are slightly less wide apart than the projections 26, so that a free space is left to allow passage of an inverted channel iron flange engaged over the said projection 26a perpendicularly to the baseplate 22, as will be described hereinafter.

Figure 9:
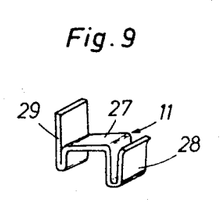
FIGURE 9 is a perspective view of a clip for fastening panels on the posts.

The clips 11 are made of a material having a certain elasticity, for example steel or a plastic material. They have a web portion 27 at one end of which there is, a U-shaped curved part 28 capable of being inserted elastically over a projection 26 of a bracket 10 and, at the other end, there is, a head 29 which forms a T-shape with the web portion 27.

Figure 12:
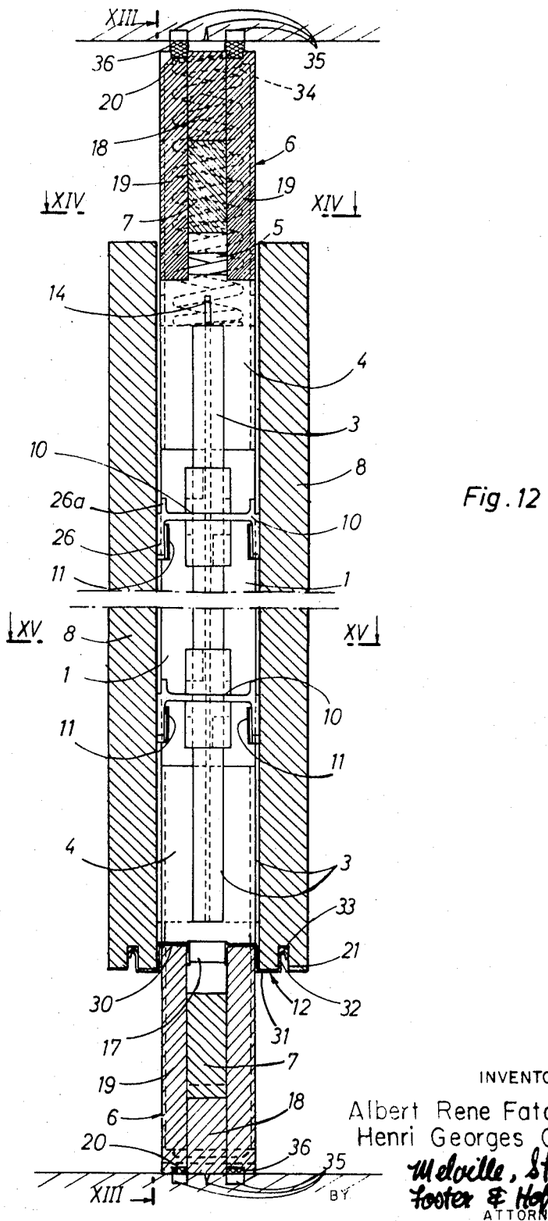
FIGURE 12 is a view in vertical cross-section of a partition mounted on a post.

The mounts 12 which support the panel on the plinth (FIG. 12), likewise are made of a material such as steel or plastic and comprise two head-to-tail gutters, one of which, 30, is adapted to fit over the upper portion of a fillet, of a plinth, the other, 31, being adapted to receive a partition panel, its free edge 32, curved over at the end 33, engaging in the bottom groove 21 in the said panel. It will thus be appreciated that the mounts 12 have a substantially right-angle S-shaped cross section.

Figure 10:
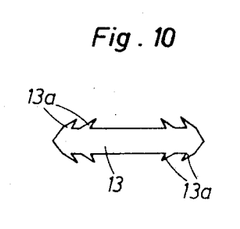
FIGURE 10 is an end view of an assembly tongue.

The loose tongues 13 are made from a plastics material such as neoprene, or if necessary wood or aluminium. In the example shown in FIG. 10, the loose tongue is of generally rectangular cross-section with a thickness slightly less than the width of the grooves 21 provided in the panels and, in the vicinity of its lateral edges, it is provided with ribs 13a which are slightly inclined towards the axis of the tongue, these ribs providing for satisfactory engagement of the tongue, in the said grooves and so ensuring a better seal.

To assemble a partition, first the framework is placed in position, comprising the posts 1 with their end pieces 4 and the plinths and cornices 6. For this purpose, one end piece 4 is fitted over each end of each post 1, a spring 5 being inserted between the top end of the post and the box member comprising the end piece 4. In order to ensure suitable centring of this spring, a circular recess 34 is provided inside the bottom of the post end pieces. The first post, fitted in this way with its end pieces, is simply placed in position between the floor and ceiling, the jack constituted by the top end piece and the spring on which it is supported ensuring that the post remains in position. To provide for a better gripping of the posts, the end pieces 4 are provided on their extreme face with cruciform protuberances 35 which bit into the ceiling at the top and into the floor at the top and into the floor at the bottom. A plinth element 6 is then placed on the floor in the direction of the partition which is to be erected, and a wedge 7 is introduced into the plinth element 6, the projection 16 (FIG. 1) engaging in the corresponding opening 15 of the bottom end piece and sealing elements 36 (FIG. 12) being fitted into the grooves 20 provided on the surface of the plinth which is in contact with the floor. A similar procedure is adapted with a cornice element at the top of the post, after which the following post is placed in position, the wedges 7 situated at the other end of the plinth and cornice element ensuring that these latter are secured on this new post, and so on.

On completion of the framework, it is then possible to place electrical cables along the plinths, in the free space provided on top of their core 18, between the two fillets 19, and to fit power sockets at desired points in the large openings 15 in the bottom end pieces of the posts, on that face thereof which is directed outwards. The insertion of wires necessary to feed switches and possibly fanlights for openings which were mentioned hereafter, may be left at this stage.

Before, during or after the incorporation of electrical cables, a plurality of brackets 11, for example three brackets distributed along the post (FIG. 10), are attached to the sole plates of the post which are in alignment with the partitions. For this purpose, the baseplate 22 of each bracket will be offered up to the corresponding sole plate, the longitudinal axis of this member being slightly biased in relation to the axis of the post so as to allow the projections 23 to engage over the two opposite edges of the sole plate in question, after which the bracket is pivoted to bring the longitudinal axis of the plate 22 parallel with the axis of the post, the effect of this being to engage the projections 23 fully over the sole plate of this latter, the lugs 24 hooking over the edge of the sole plate opposite the corresponding projection 23.

Figure 11:
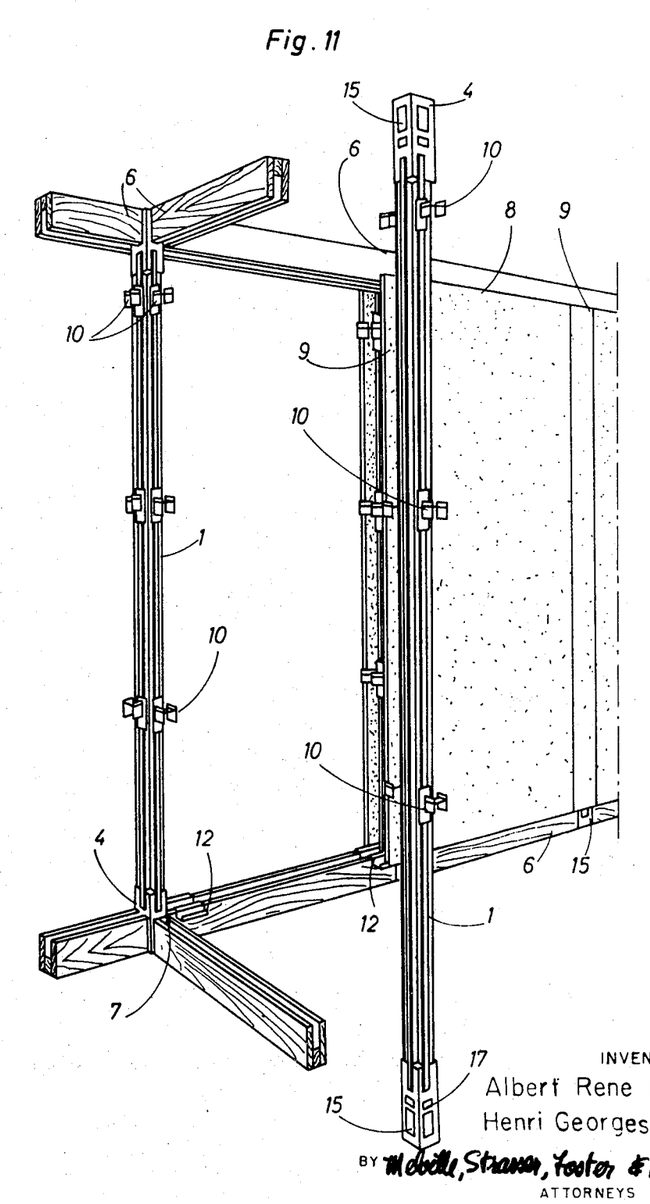
FIGURE 11 is a general view in perspective of the assembly of partitions.

In order then to fit the panels 8 and 9, mounts 12 are engaged over the plinths, in the vicintiy of each post. In each of the lateral grooves 21 of a panel 9 (FIG. 1) are engaged, first a loose tongue 13 (FIG. 10), then one of the sides of the heads 29 of as many clips 12 as there are brackets 10 previously mounted on each post (e.g. three in the example shown at FIGURE 11), each slip being placed at a level which, once the panel has been fitted as explained hereinafter, is slightly higher than that of the corresponding bracket. The panel is then placed against a post so that it rests on the mounts the upper extremity of this panel being applied against the cornice, after which the clips 11 are slid downwardly to engage their parts 28 over the lateral projections 26 of the brackets 10.

The panel 8 which is intended to be placed along one side of the panel 9 which has thus been mounted is then equipped with a loose tongue 13 and with clips 12 in the same manner as hereabove explained for panel 9, but only on the side of the said panel 8 which will be opposed to the said panel 9, leaving free the groove 21 in the side of the panel 8 which will abut against the panel 9. The panel 8 is then placed on the supporting mounts 12 with its top part applied against the cornice, at a certain distance from the previously mounted panel 9, after which it is slid laterally against the said panel 9, so that the free edge of the loose tongue 13 and the free sides of the heads 29 of the clips 12 carried by the corresponding side of the said panel 9 engage in the free lateral groove 21 in the panel 8. The clips 12 on the other side of the panel 8 are then slid downwardly to engage the corresponding brackets on the next post. A further panel 9 is then prepared in a similar manner as the above mentioned panel 8 and is set in place as was the said panel 8, and so on.

It will be observed that the panels are therefore fixed with a freedom of vertical movement and rest simply on support mounts disposed on the plinths, with no fixing to the cornices, on which they are simply applied, which makes it possible to absorb any tolerances and movements of the buliding without any apparent disorder or cracking.

In certain cases, instead of positioning a panel 8 against each post, to which has been fitted a narrow panel 9, it is possible to jump a post, disposing between those situated on either side of the post a single panel, the width of which is equal to twice the building module less the thickness of the partition, the said panel continuously covering the gap between the two posts in question.

Figure 16:
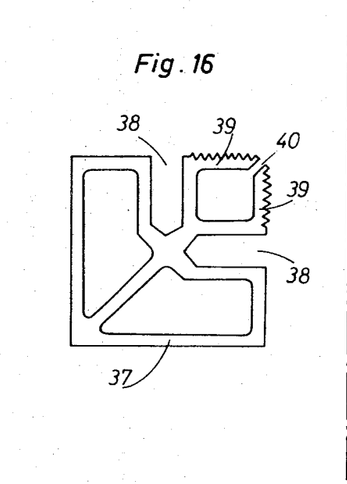
FIGURE 16 is an end view of an angular connecting section.

In the event of two partitions having to form a right-angle with each other, whether this be an obtuse angle or an acute or internal angle, particular connecting sections of substantially square-cross-section are used; an example of the connecting sections is shown in FIG. 16, and comprises a hollow section 37 of substantially square-cross-section, made from rigid plastics or aluminium (or, if need be, from a solid timber section) exhibiting in the median plane of each of two of its concurrent faces a groove 38 of a size equal to that of the groves 21 provided in the edges of the panels. The adjacent faces of the connecting sections which are between the grooves 38 are preferably ribbed as indicated at 39 and, if the section is intended to form an acute angle, the edge of the connecting section where the two adjacent faces meet has slot 40 along its entire length designed to receive a corner covering member as will be stated hereinafter.

Where an acute, recessed or internal angle is to be formed (FIG. 17, bottom, left-hand corner) brackets 10 are fitted over the sole plates of two webs of the post which correspond to the two partitions forming this angle and, into the corner formed by the lateral projections 26 of these brackets is fitted an angle connecting section 37 which is clipped onto the bracket by means of clips 11, the heads of which engage in the grooves, 38 which are provided with loose tongues 13 in the same way as has been described for the panels. The panels abutting at the corner are mounted as previously stated.

In the case where an obtuse or external angle is to be formed, the first stage is to thread onto the flanges of the post corresponding to this angle special members hereinafter referred to as free opening cover fixing members. These cover fixing members each consist of a wooden section 41, the length of which is substantially equal to that of the post, having a substantially trapezoidal cross-section, the adjacent angles of the long base of trapezium being truncated so as to have lateral plane faces 42 separated by a distance substantially equal to the width of the post. In the median axis of the face of each member, corresponding to the small base of the trapezium is provided a T-shaped slot 43 allowing the member 41 to be slid on a respective sole plate of the post 1. Threaded passages 44 are disposed at at least two points along the length of each member 41, between the face of the said member 41, corresponding to the large base of the trapezium and the bottom of the T-shaped slot, each intended to receive a centring screw 45 by which it is possible to immobilise the member 41 in relation to the post. Furthermore, guide holes are provided on the free face of the member 41, corresponding to the large base of the trapezium, to receive wires or screws as will be indicated hereinafter.

At the time of assembling the angular joint, an angular connecting section 37 is fitted in each of the angles formed by the flanges 26 of the brackets 10 carried by the sole plates of the post, which are not fitted with free opening cover fixing members 41, on the one hand, and the corresponding lateral portion of these members on the other, the said angular connecting sections being clipped, as stated previously, to the brackets 10; then, in the angle formed by the adjacent lateral faces of the two cover fixing members 41, is housed a third angular connecting section 37 so that the grooves 38 of this connecting section face outwards. Into the grooves 38 of the angular connecting sections 37, in a manner so as to cover the free opening cover fixing members, are inserted the lateral arms of a section referred to hereinafter as the free opening cover section, which consists of a rolled metal or plastic section 46 of flattened U-shaped, the length of which is equal to the height between the ceiling and floor less the visible height of the cornice, and which has two lateral arms 47 disposed so as to engage in the groove 38 of an angular connecting section 37 and in the web of which are provided milled holes 48 to take screws 49 which engage in the aforesaid guide holes in the free opening cover fixing member.

Figures 17, 18:
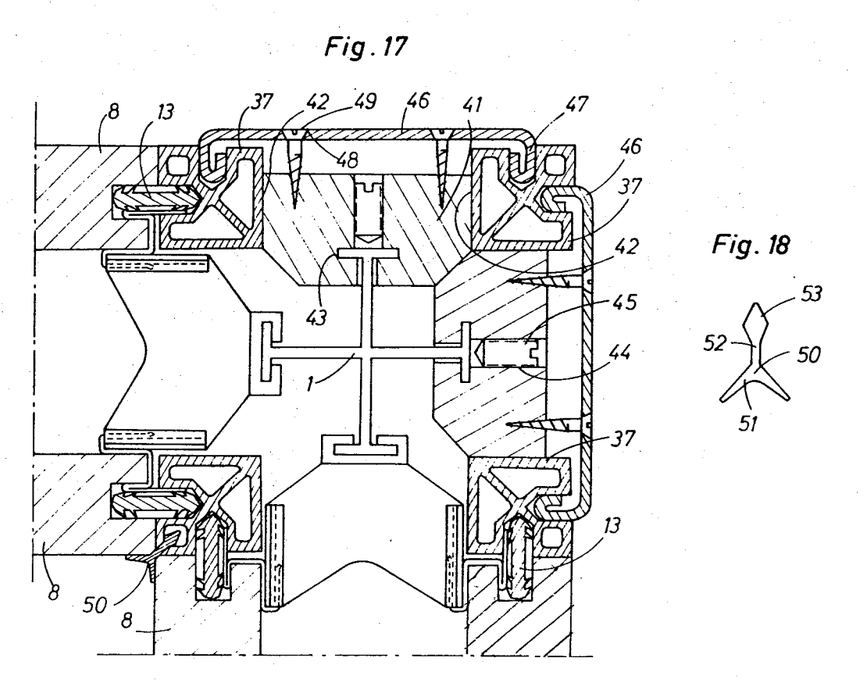
FIGURE 17 is a view in horizontal section of the angular connection of two partitions forming a right angle with one another.
FIGURE 18 is an end view of a covering member, on a larger scale.

To cover recessed acute or internal angles, a special corner covering section is used, of the type shown in FIG. 18; this consists of a rectangular section 50 of flexible plastics material, formed by an angled part 51, the outer edge apex or which merges with a strip 52 which is directed along the external bisector plane of the angle and which ends in a flange 53 of spearhead shape. The said covering section 50 is fitted by inserting the strip 52 into the slot 40 provided on the edge of the angular connecting section 37 which is at the apex of the recessed angle, between the partition panels, the flange 53 anchoring the covering section 50 by engaging into the internal recess in which the slot 40 leads and the two external faces of the angled part 51 being applied against the corresponding partition panels.

In the case of obtuse or external angles, angular connecting sections 37 are preferably used which do not have the slot 40.

It will be appreciated that when it is required to join two partitions in a T-shape, the two recessed angles are fitted at the joint of two partitions in the manner previously described, while the opposite face of the partition which forms the cross-piece of the T has a panel 9 of a width equal to the thickness of the partition, as has been described previously.

The openings in the partitions assembled in accordance with the invention to provide access between rooms formed by the partitions are positioned between two successive posts. If there is to be a free opening, then on the sole plate of each of the two posts which are facing the opening, a free opening cover fixing member 41 is fitted, such as has been described hereinbefore and, on either side of the opening a free opening cover section 46 is fitted, the lateral members 47 of this section being engaged in the vertical grooves 21 in the panels situated on either side of each post, the said section 46 being secured by screws 48, as is shown in FIG. 17.

Figure 19:
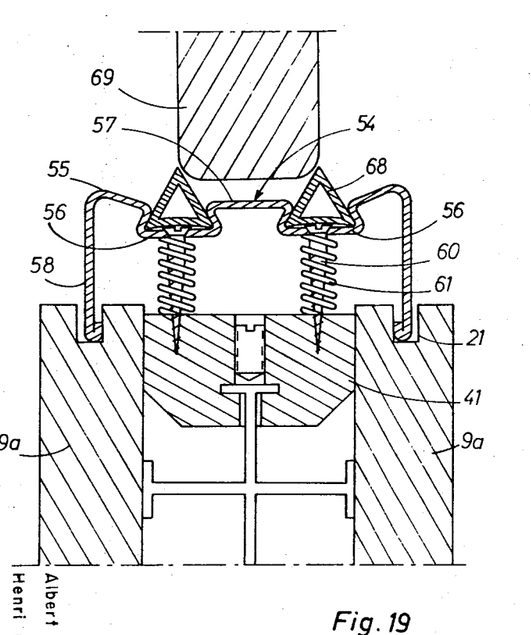
FIGURE 19 is a horizontal section showing the assembly of a door case.
Figure 20:
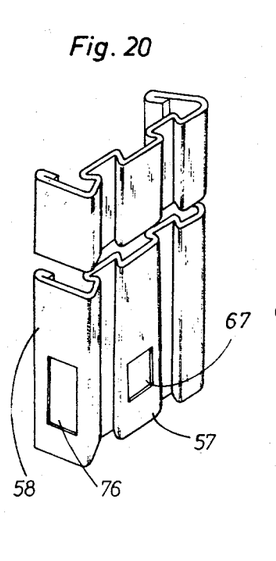
FIGURE 20 is a perspective view in elevation of a door frame upright.

If the openings are to be closed by a door, then, in the way which has just been stated, opening cover fixing members 41 are placed on the posts situated on either side of the opening and one of the special sections referred to hereinafter as door frame sections 54 is fitted on each of these members. These sections 54 (FIG. 19) consist of a rectilinear rigid plastic or metal section 54 (FIG. 20), the length of which is equal to the height between ceiling and floor less the visible height of the cornice, and which has a generally flattened U-shaped cross-section, the base of which is bent back to form two lateral flanges 55, two dove-tailed grooves 56 situated on either side of the median plane of the section 54 and a plane central portion 57, the two arms 58 of the section being adapted so that their free ends can penetrate into the vertical grooves 21 of the panels 9a situated on either side of the post concerned. The door frame section 54 is fixed in position by screws 59 engaged in holes 60 provided for the purpose in the bottom of the grooves 56 in the section 54 and in guide holes prepared in the opening cover fixing member. Springs 61 are threaded onto the screws 59 to allow the position of this section 54 to be adjusted.

Figure 21:
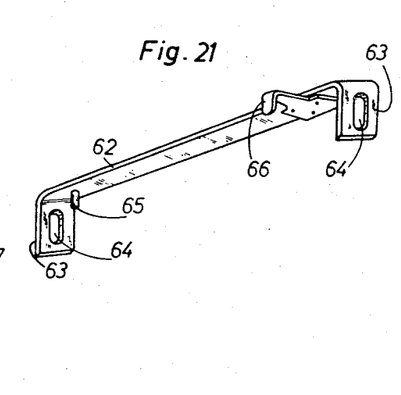
FIGURE 21 is a view in perspective from below of a fanlight rest bar.

In either case, at the height corresponding to the height of the opening to be provided, a fanlight support bar is then secured between the free opening covering sections 46 or the door frame sections 54. The said bar consists (FIG. 21) of a flat iron member 62, the width of which is substantially equal to that of the axial channel in the cornice pieces while the length is equal to the width of the opening; at its two ends it is folded back to form projections 63 in which are provided elongated holes 64 to allow the passage of screws which secure the fanlight support bar by engaging in threaded holes provided for this purpose in the covering sections 46 or door frame sections 54, the elongated shape of the said holes permitting of possible vertical adjustment. When the opening is intended to accommodate a door, then, beneath the bar 62 is provided on the one side a top pivot 65 for the door and, on the other side, a door stop member 66, threaded holes being provided for this purpose at desired points in the bar 62.

It must be noted that the form of this bar is such that it can be turned around according to the side on which the door opens, it being possible for the door to open in one direction or the other. This is achieved simply by turning round the door stop 66. The door itself is made up in a known manner per se according to the so-called "isoplane" type of door, but with no casing fillister. A bottom pivot for this door is placed on the floor, to correspond with the pivot 65 which is carried by the fanlight support bar 62. The lock is placed in the horizontal axis of symmetry of the door so that it may be used even if said door is turned round to modify its direction of opening, an adequate opening 67 being provided in the plane axial part 57 of the door frame sections to receive the latch.

The door is tightly closed along the door frame sections by fillister sections constituted by shaped sections 68, each of which is formed by a hollow section made from flexible plastic material, of triangular cross-section, the length of which is substantially equal to the distance between the floor and the fanlight bar, such a section being introduced into each of the dove-tail grooves 56 of the door frame sections, the two lateral edges of the door 69 (FIG. 19) being situated between the two corresponding sections when the door is closed.

Figure 22:
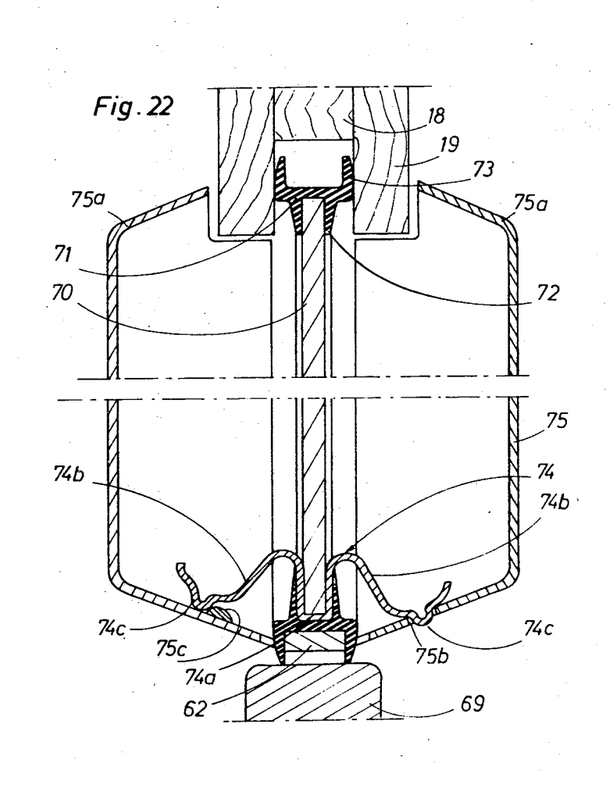
FIGURE 22 is a vertical section showing assembly of a fanlight.

In the frame formed by the fanlight bar 62, the tops of the two door frame sections and the ceiling, there is a rectangular fanlight support plate 70 (FIG. 22) of rigid material, for example wood or asbestos cement, the four sides of which are trimmed with a fanlight covering section 71 made from resilient plastics material, which is formed of two channels having a common axial plane, opening in opposite directions, in other words a narrow channel 72 which is disposed to fit over the edges of the plate 70 and a wider channel 73, the outer sides of which are slightly convergent and the dimensions of which are such that it may either be introduced by force into the axial channels of a cornice member, or be engaged to fit over the fanlight bar 62. In this way, the plate 70 is held by its covering section engaging in the cornice channel, at its top and over the fanlight bar 62 at the bottom, the two sides of the wider channel 73 situated along the lateral edges of the plate 70 pressing against the axial plane portion of the door frame sections, and those of the lower covering section spreading around the fanlight rest bar to ensure a tight seal around the top of the door.

Figure 23:
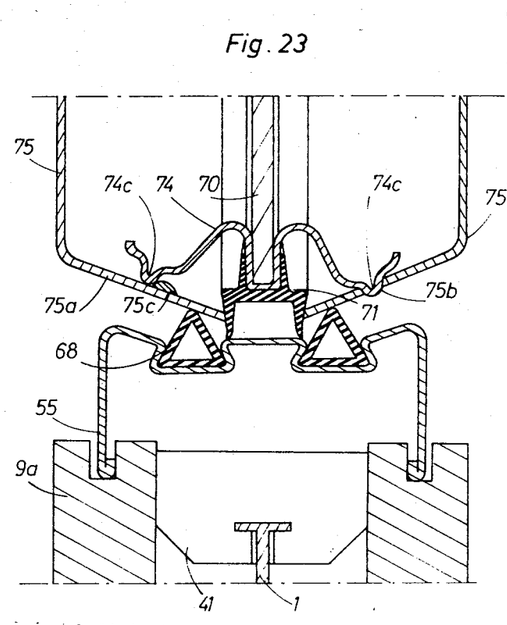
FIGURE 23 is a partial horizontal section corresponding to FIGURE 22.

Before placing the covering section 71 around the plate 70, clips 74 (FIGS. 22 and 23) made from steel hoop, 1 to 2 cm. wide, for example, are engaged over the bottom and lateral edges of the plate 70 and in the vicinity of the respective ends of these edges. The clips 74 comprise on either side of a central U-shaped portion 74a which is adapted to engage over an edge of the plate 70, two flanges 74b, which are curved back upon themselves, and in the vicinity of their ends, are formed with an attachment projection 74c. To these clips 74 and on either side of the plate 70 are secured fanlight panels 75 made from rigid opaque or transluscent material; for this purpose, the fanlight panels 75, which take the form of a rectangular tray with flared-out lateral walls 75a, may have, as shown in the right-hand portion of FIG. 22 and in the bottom right-hand of FIG. 23, in the said lateral walls, rectangular apertures 75b so that, when a panel 75 is fitted over the corresponding flanges 74b of the clips 74, and correctly positioned the connections 74c of these flanges penetrate into the said apertures, so securing the panel. According to another embodiment shown in the left-hand part of FIG. 22 and in the upper left hand part of FIG. 23, a bulge 75c is provided on the inside face of the panels 75, either along a continuous line over the length of each wall or locally, these bulges engaging behind the projections 74c of the clips 74.

It can be observed that the width (or height) of the lateral walls 75a of the fanlight panels 75 is such that, at the top and bottom, these walls respectively do not reach either the cornices or the fanlight covering whereas, at the sides, they come into contact with the said covering. Vents are this provided which permit of internal ventilation in the event of it being desirable to employ the fanlight to provide space lighting and where, in the space comprised between the plate 70 and the fanlight panel 75, there are disposed lighting means (not shown), such as a bulb or a tube, the supply cables for which pass through the door frame sections. The switch would in this case be housed in an aperture 76 (FIG. 20) provided for the purpose and at the desired height in the lateral faces 58 of the said door frame sections.

In order to permit, if applicable, the passage of light from one room to another via the fanlight, it is possible to replace the wooden or asbestos cement plate 70 by a transparent or translucent plate made from glass or plastic material, in which case the clips 74 and the panel 75 are not fitted, covering trims, not shown, being possibly fitted to mask the parts of the fanlight frame which, if seen, might be considered as not being aesthetic.

It is also possible to provide fixed openings in the partitions to form windows. For this purpose, at the position envisage for such an opening, special bottom panels are provided which are secured on brackets 10 (FIG. 13) and which rest on support mounts 12, in the same way as the conventional panels, but the height of which is such that they stop at the level of the bottom of the opening. Also, special upper panels are provided which are likewise clipped on brackets 10, but the height of these is such that their top edge is at the level of the adjacent panels while their bottom edge is level with the top edge of the opening, these latter panels being held in the vertical direction in a manner which will hereinafter be described. An opening frame is formed by means of sections 77 situated on either side of the opening and sections 78 running along the bottom and top of the opening and so situated that the two sections 77 have their bottom ends resting on the bottom sections 78 and so that the top sections 78 rests on the top ends of the sections 77.

Figure 24:
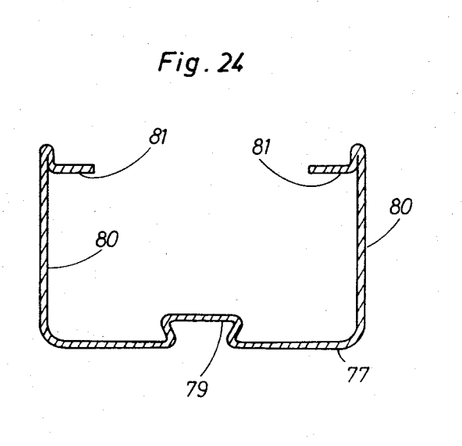
FIGURE 24 is a view in section of a fixed opening frame section for use in a vertical position.
Figures 25, 26:
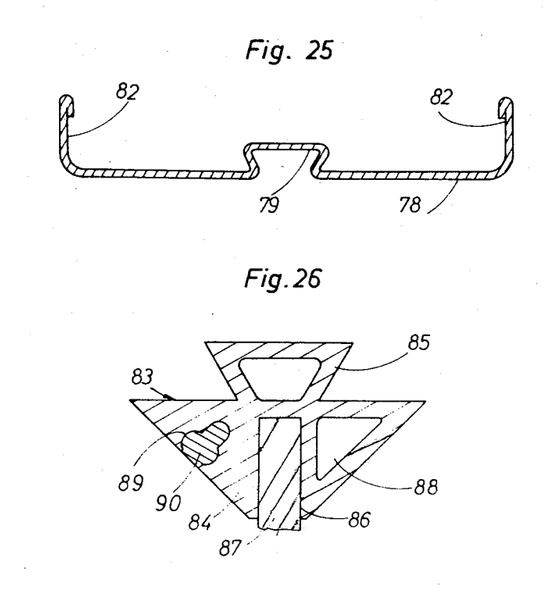
FIGURE 25 is a view in section of a fixed opening stution for use in a horizontal position.
FIGURE 26 is a view in section of a further fixed opening frame section.

The sections 77 are constituted (FIG. 24) by a rigid plastics or metal section having a generally U-shaped cross-section, the base of which is deformed to offer a dovetail axial groove 79, while its sides 80 are disposed to penetrate into the grooves 21 of the panels situated on either side of the opening, these sides each being extended by an internally bent rebate 81 acting as an abutment against the corresponding portion of the said panels. The sections 78 (FIG. 25) have a flattened U-shape similar to that of the sections 77 but with a sufficient width for their sides 82 to engage, at the top, the panels situated on either side of the opening, the base of these sections 78 being formed with an axial groove 79. The lower opening support is engaged over the top edges of the special panels situated beneath the opening, while those of these panels which are above the opening rest in the top bay section which itself rests on the sections 77. The glass panel, which closes the opening is held in place by means of a fixed opening frame section 83 engaged over the four edges of the glass and constituted by a flexible plastic section (FIG. 26) comprising a body 84 of generally rectangular-isosceles triangular cross-section, the hypotenuse of which carrier an axial hollow dovetail rib 85. Provided in the body of this section is a longitudinal groove 86 opening at the apex edge of the said body and adapted to receive the edge of the glass or sheet 87. The said groove 86 divides the body of the section into two parts, one of which is preferably hollow at 88, while in the other there is a longitudinal slot 89 having an "ace of clubs" cross-section. A profiled ring 90 of complementary form can fit into the slot 89. The frame section 83 is placed in position around the opening frame by introducing the rib 85 into the groove 79 of the sections 77 and 78 defining the opening after which, when the rings 90 have been removed from the slots 89 to allow slot 86 to be opened, the glass 87 is engaged therein, after which the rings 90 are placed back into the slots 89 to secure the glass pane in position.

As has already been mentioned, the electrical cables necessary for the room lighting installation are disposed in slots formed inside the plinths and in the door frame sections, the electricity supply cable(s) coming either from the ceiling or from the floor, passing through an aperture provided for the purpose in the bottom of the post end pieces. The sockets are incorporated at the desired position and in known manner in the apertures 15 provided in the visible faces of the bottom post end pieces, while the switches are inserted, likewise at the desired positions, in the apertures 76 provided in the side faces of the door frame uprights. The apertures 15 and 76 which are not provided with a socket or a switch are masked by a cover (not shown) which consists of a small plate with two leaf springs by which it is secured into the aperture which it is to mask.

It will be appreciated that many alternative embodiments may be applied to the various partition-constituting elements described hereinabove by way of example, particularly with regard to the materials used, the form of the various means of attachment and special sections and the details of assembly, without departing from the scope of the invention.

For example, when panels are used, having a width equal to twice the building module minus the thickness of the partition, it is possible to dispense with the post which would normally be disposed in the vertical median axis of such a panel. The spacing between axes of two adjacent posts being then equal to twice the building module, special plinth and cornice pieces are provided which are of corresponding length. In this case, to ensure satisfactory rigidity in the whole panel, reversed U-irons are used, the lengths of which are equal to the distance between the oppositely situated sole plates of two successive posts. When these are placed in position, the aperture therein is directed downwards, over the top projections 26a of the brackets 10.

Such U-irons, of suitable length, can likewise be placed between two consecutive posts set at the normal spacing, to serve either as additional horizontal stiffeners or as elements for securing heavy objects such as sanitary appliances, heavy shelves, etc.

Moreover, the cover fixing members 41 or door frame uprights, instead of being of a length such that a single member is fitted on one sole plate of a post, may be made up of sections of small length; for example three sections of this type may be fitted on one post sole plate and set at the desired levels to receive the fixing screws of the sections which are to be connected to them.

The various coverings, door frame uprights, post end pieces and other items which remain visible after assembly may take any surface covering or treatment which is adapted to give the whole a pleasant appearance.

As will have been observed, the partitions according to the invention may be assembled with only a screwdriver, which is needed to secure the free opening cover fixing members 41 and the door frame sections on the posts, and the fixing of the said free opening cover sections 46 and door frame sections 54 and the adjustment of the position of the latter, and the fixing and adaption of the fanlight support bars 62; therefore, for this assembly work, there is no need to use specialised labour. Furthermore, all the elements used to make up the partition and accessories are each of a single standard model, which allows them to be industrially produced under optimum conditions of economy. These elements are supplied ready for use with no need for any manual adaptation on site.

In all the foregoing, we have been concerned solely with partitions allowing the separation of the various rooms of premises, but it will be readily appreciated that all the partition elements in accordance with the invention may be used for making internal retaining walls, by erecting the partitions directly against the walls which are to be lined, in the manner described above, in which case, the panels 8 and 9 will be placed only on the side opposed to said walls.

What is claimed is:

1. A prefabricated system constituting partition walls in a building, comprising a plurality of vertically erected, aligned, posts having a cross section in the form of a potent across with four angles orranged at right angles and sole plates terminating said flanges perpendicularly thereto, bottom and post end-pieces each formed of a parallelepiped box-like member having a square cross section with four side faces, one open end, and one at least partly closed end opposite to said open end and engaged on the respective ends of each of said posts for connection thereof with floor and ceiling of the building, respectively, with each side face parallel with a sole plate of said posts, horizontal plinth and cornice members having a U-shaped cross section providing an axial channel, said horizontal plinth and cornice members extending between each two successively aligned posts along the floor and ceiling, respectively, and panel members formed of boards having lateral sides with longitudinal grooves therein, said panels being supported by said plinth members in a direction parallel therewith and being attached to said posts, in which system each of said horizontal plinth and cornice member is secured at each end to the corresponding post end-piece of the adjacent post by means of a wedge member engaged in the channel of said horizontal member, and having an extension protruding from said end in an axial direction and engaging an opening provided in the adjacent side face of said end piece, a compression spring is inserted within each top end-piece between the closed end of said end-piece and the corresponding end of the post on which said top end-piece is engaged, to urge said top end-piece against the ceiling, and each panel is attached to at least one post by means of clips slidingly engaged in the lateral grooves of said panel and each engaging a bracket member having means for resiliently gripping on the sole plate of said post which extends perpendicularly to said panel, whereby a free relative movement can take place between the unit formed of a cornice member and the top post end-pieces at each end thereof, on the one hand, and the panel attached to the post, on the other.

2. A partition wall assembly as claimed in claim 1, in which the dimensions of the square cross section of each said post end-pieces are such that it fits inside said sole plates of said posts, and longitudinal slots are provided axially in each side face of said end-piece, each end-piece being engaged in one end of a post with each flange of said post entering a slot in said end-piece.

3. A partition wall assembly as claimed in claim 1, in which said panels are supported by said plinth members by means of a mount having a substantially right-angled S-shaped cross-section and comprising a first hook part engaging one one side of the U formed by a plinth member, and, integral therewith, a second hook part in which engages a panel.

4. A partition wall assembly as claimed in claim 1, in which said bracket member comprises a substantially rectangular securing plate of slightly helical form having a width which is slightly greater than that of the sole plate on which it is applied, hook-shaped projections on one face of said securing plate and integral therewith, arranged in two diagonally opposed corners thereof, and engaging the corresponding edges of said sole plate, two lugs protruding on said one face of said securing plate in the other two corners thereof, abutting laterally one said edges, and a U-shaped projection on the other face of said securing plate, integral therewith, and having two wings extending substantially perpendicularly to said other face, in two spaced planes parallel with the longitudinal axis of said securing, and said clips are shaped to have a U-shaped portion resiliently engaging over one of said wings, followed by a T-shaped part having a cross member which penetrates said lateral grooves in said panels.

References Cited

UNITED STATES PATENTS

| | | | |
|---|---|---|---|
| 2,009,267 | 7/1935 | Kotrbaty | 52—215 |
| 2,317,635 | 4/1943 | Olsen | 52—281 |
| 2,444,091 | 6/1948 | Carlsen | 52—732 X |
| 2,679,915 | 6/1954 | Clingman | 52—214 |
| 2,741,345 | 4/1956 | Herr | 52—217 X |
| 3,070,646 | 12/1962 | Lindgren | 52—282 X |
| 3,193,061 | 7/1965 | Downes | 52—729 X |
| 3,265,416 | 8/1966 | Downes | 52—238 X |
| 3,292,328 | 12/1966 | Lewis et al. | 52—481 X |
| 3,374,703 | 3/1968 | Davis et al. | 52—586 X |
| 3,381,438 | 5/1968 | Bohnsack | 52—481 |

FOREIGN PATENTS

| | | |
|---|---|---|
| 864,147 | 1/1953 | Germany. |
| 1,352,778 | 4/1963 | France. |

FRANK L. ABBOTT, Primary Examiner

SAM D. BURKE III, Assistant Examiner

U.S. Cl. X.R.

52—208, 481, 281, 301, 489